United States Patent [19]

Allen, Jr. et al.

[11] 4,248,099

[45] Feb. 3, 1981

[54] MASS RATE OF FLOW METER WITH IMPROVED FLUID DRIVE

[75] Inventors: Malcolm H. Allen, Jr., Melrose; Colby E. Buzzell, Wilmington, both of Mass.

[73] Assignee: General Electric Company, Wilmington, Mass.

[21] Appl. No.: 84,061

[22] Filed: Oct. 12, 1979

[51] Int. Cl.³ .............................................. G01F 1/82
[52] U.S. Cl. ................................................ 73/861.36
[58] Field of Search ................ 73/194 M, 202, 231 R, 73/231 M

[56] References Cited

U.S. PATENT DOCUMENTS

| | | | |
|---|---|---|---|
| 3,538,767 | 11/1970 | Pustell et al. | 73/231 |
| 3,722,279 | 3/1973 | Jablonski | 73/231 |
| 4,056,976 | 11/1977 | Hildebrand et al. | 73/231 |

Primary Examiner—Herbert Goldstein
Attorney, Agent, or Firm—I. David Blumenfeld

[57] ABSTRACT

An improved cylindrical conduit for directing fluid flow to the swirl generator of an angular momentum type rate of flow meter commonly employed in measuring fuel flow rate in aircraft engines. The conduit includes a first set of longitudinally extending, resilient fingers and a second set of concentric sealing fingers that seal the resilient fingers in the first set. At low flow rates, the sealing fingers prevent leakage between the resilient fingers and the conduit directs substantially all fluid to the swirl generator.

4 Claims, 4 Drawing Figures

MASS RATE OF FLOW METER WITH IMPROVED FLUID DRIVE

BACKGROUND OF THE INVENTION

This invention relates to mass rate of flow meters of the angular momentum type having a swirl generator for imparting angular momentum to a measured fluid stream and a restrained reaction turbine for removing the imparted angular momentum. More particularly, the invention relates to such flowmeters having an improved construction for preventing leakage and optimizing fluid flow at low flow rates.

A mass rate of flow meter of the angular momentum type is disclosed by Hildebrand et al in U.S. Pat. No. 4,056,976, issued Nov. 8, 1977, titled "Mass Rate of Flow Meter" and assigned to the same assignee as the present invention. In this prior art flowmeter, a swirl generator includes radially extending skewed vanes that impart angular momentum to the fluid passing between the vanes. Swirling fluid from the swirl generator passes through multiple tubes in an unrestrained rotor located downstream. Fluid leaving the rotor has the same angular velocity as the rotor. The restrained reaction turbine also includes multiple tubes that form longitudinal flow channels. As swirling fluid leaves the rotor, the restrained reaction turbine removes the angular momentum from fluid flowing through the longitudinal channels. The torque it experiences in doing so is balanced by a restraining means including a biased spring that permits measurement of flow rate by methods not material to the present invention.

U.S. Pat. No. 3,538,767, issued Nov. 10, 1970, titled "Flowmeter Fluid Drive", and assigned to the same assignee as the present invention, discloses another type of flowmeter that incorporates a torque motor for restraining the turbine. This flowmeter includes a cylindrical conduit within the flowmeter casing for conducting fluid to the swirl generator. The conduit comprises longitudinally extending resilient fingers that maintain a substantially cylindrical shape of the conduit at low flow rates in order that the conduit directs as much incoming fluid as possible to the swirl generator. At high flow rates, the same resilient fingers deflect outwardly in response to fluid pressure to control the angular momentum imparted to the fluid.

Thus the total fluid flow downstream from the swirl generator is a mixture of flows that have gone through the vanes on the swirl generator or bypassed them under the control of the conduit. This control prevents the swirl velocity of the fluid entering the reaction turbine from becoming excessive at high flow rates.

In flowmeters of the type described in the foregoing U.S. Pat. No. 4,056,976, timing circuits sense start and stop pulses induced in a pair of coils and use these pulses to determine rotor speed and to determine deflection of the restrained reaction turbine. The amplitude and width of these pulses vary with rotor speed. In the unrestrained rotor flowmeters, however, the rotor can have a wider range of angular velocities (e.g., from 1 to 6 revolutions per second). Thus, the timing circuits must either include circuitry for compensating these variations or operate with inaccuracies.

At low flow rates, it has been found that even compensated flowmeters of this type tend to have non-linear errors that are not readily compensated. Several sources of these inaccuracies have been found. One source is fluid leakage between the individual resilient fingers of the cylindrical conduit. This leakage limits the percentage of fluid flow affected by the swirl generator at low flow rates. As a result, the angular velocity of the rotor decreases as the flow rate decreases. Moreover, the angular velocity can reach a level at which accurate measurements of the start and stop pulse timing become difficult to achieve.

SUMMARY

Therefore, it is an object of the present invention to provide an improved mass rate of flow meter of the angular momentum type that enables more accurate measurements at low flow rates.

A further object of this invention is to provide an improved mass flow meter of the angular momentum type that reduces fluid leakage between the resilient fingers of a cylindrical conduit that directs fluid through and around the swirl generator.

Yet a further object of this invention is to minimize the changes in angular velocity of an unrestrained rotor in mass rate of flow meters over a wide range of flow rates.

In accordance with this invention, the above objects are achieved by improving the substantially cylindrical conduit that directs fluid to and around the swirl generator. More specifically, the improvement includes conduit means comprising longitudinally extending, independently resilient fingers and sealing means contiguous to said resilient fingers for substantially reducing leakage between said resilient fingers.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
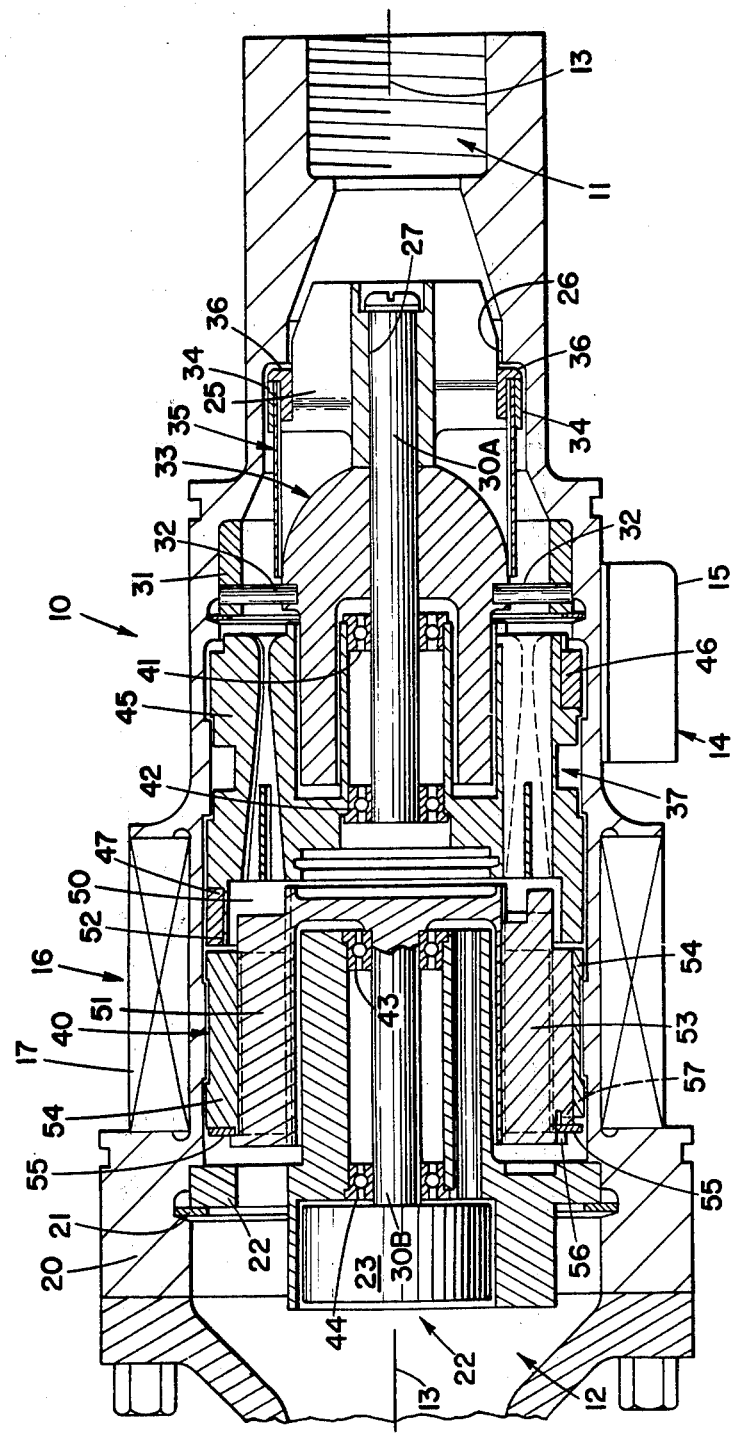
FIG. 1 is a longitudinal view in cross-section of a mass rate of flow meter embodying this invention.

FIG. 1 illustrates an exemplary flowmeter that incorporates this invention. It comprises a housing 10 having an inlet port 11 and an outlet port 12 at the ends of the housing 10 which, with other elements of the flowmeter, defines a generally annular passage for a fluid, such as aircraft fuel. The passage is generally disposed along a longitudinal axis 13. A first sensing coil assembly 14 generates first timing, or start, pulses and is affixed to the housing 10. The assembly 14 has a longitudinal axis that is perpendicular to the axis 13 and is secured in a shield 15.

A second sensing coil assembly 16 generates second, or stop, timing pulses and is also affixed to the housing 10. The assembly 16 has a longitudinal axis that is coincident with the axis 13 and includes a sensing coil 17 that is disposed at a flange 20 at the outlet port 12. Conductors from both the first sensing coil assembly 14 and the second sensing coil assembly 16 terminate at a connector assembly (not shown). Both the coil assemblies 14 and 16 are isolated from the flow of a fluid through the housing 10.

A first inner, or turbine, assembly is radially positioned on the housing 10 by a housing end flange 20 and an end assembly 22 and is axially positioned by a retaining ring 21. The end assembly 22 also supports a spring mechanism 23. At the inlet port 11, a second inner, or rotor, assembly includes a flow straightener 24 that comprises a plurality of longitudinally extending, circumferentially spaced vanes 25. The flow straightener 24 is positioned in a tapered bore 26 and is mounted to one end of a shaft 30A. An aligned shaft 30B is supported by the end assembly 22 and lies on the longitudinal axis 13.

A forward strut element in the rotor assembly comprises a stationary annulus 31 and a plurality of struts 32 that extend inwardly from the annulus 31 and that support a swirl generator 33. The annulus 31 radially positions the rotor assembly and coacts with a retaining ring 31A to axially position the rotor assembly on the housing 10. The swirl generator 33 supports the shaft 30A. A flanged ring 34 is carried on the outer surface of the vanes 25 and supports one end of a variable diameter conduit 35 that includes a plurality of spring fingers that encircle the swirl generator 33. The conduit 35 acts as a flow responsive valve. A second ring 36 clamps the conduit 35 and the ring 34 to the vanes 25. This ring 36 also coacts with the housing 10 to radially position the shaft 30A.

A rotor 37 and a turbine 40 are journaled on shafts 30A and 30B respectively in an axially spaced relationship. Thrust bearings 41 and 42 support and position the rotor 37 on the shaft 30A; thrust bearings 43 and 44, the turbine 40 on the shaft 30B. A flat band, helical spring (not shown) in the spring mechanism 23 is clamped between the turbine 40 and the shaft 30B to restrain rotation of the turbine 40 about the shaft 30B.

An outer annulus 45 on the rotor 37 supports a group of permanent bar magnets 46 in the periphery of the rotor 37. These magnets are disposed to produce a north-south magnetic axis along a chord near the periphery of the rotor 37. Each time the magnets 46 rotate past the sensing coil assembly 14, a start pulse is induced in the coil assembly 14 that indicates the passage of a predetermined point on the rotor 37 (i.e., the location of the magnets 46) past a predetermined point on the housing 10 (i.e., the location of the coil assembly 14).

Another group of permanent magnets 47 also mounts to the outer annulus 45 of the rotor 37. More specifically, the annulus 45 has an annular extension 50 that extends toward and overlaps a portion of the turbine, specifically the ends of turbine blades 51 on the turbine. Longitudinal grooves 52 are cut in the outer surface of the extension 50 to carry longitudinaly extending, closely spaced, radially poled magnets 47. These magnets 47 also produce a field with a north-south magnetic axis lying along a chord near the periphery of the rotor 37.

In addition to the turbine blades 51, the turbine 40 carries an exciter blade 53 of a permeable material and a diametrically opposed, non-permeable, balancing blade (not shown). An outer band, or shroud, 54 fits over the turbine blade 51, the exciter blade 53, and the balancing blade. The band 54 engages a flux collecting ring 55 of a permeable material between the band 54 and a radial extension 56 on the turbine 40. The ring 55 bears against a tab 57 from the exciter blade 53 and a similar tab from the balancing blade.

Each time the magnets 47 pass the exciter blade 53, flux linkages are coupled to the coil 17 through the exciter blade 53 and the flux collection ring 55 and induce an electrical stop pulse in the sensing coil 17 that indicates the passage of another predetermined point on the rotor 37 (i.e., the location of the magnet 47) past a predetermined point on the turbine (i.e., the position of the exciter blade 53). The time between the start and stop pulses is representative of flow rate.

Figure 2:
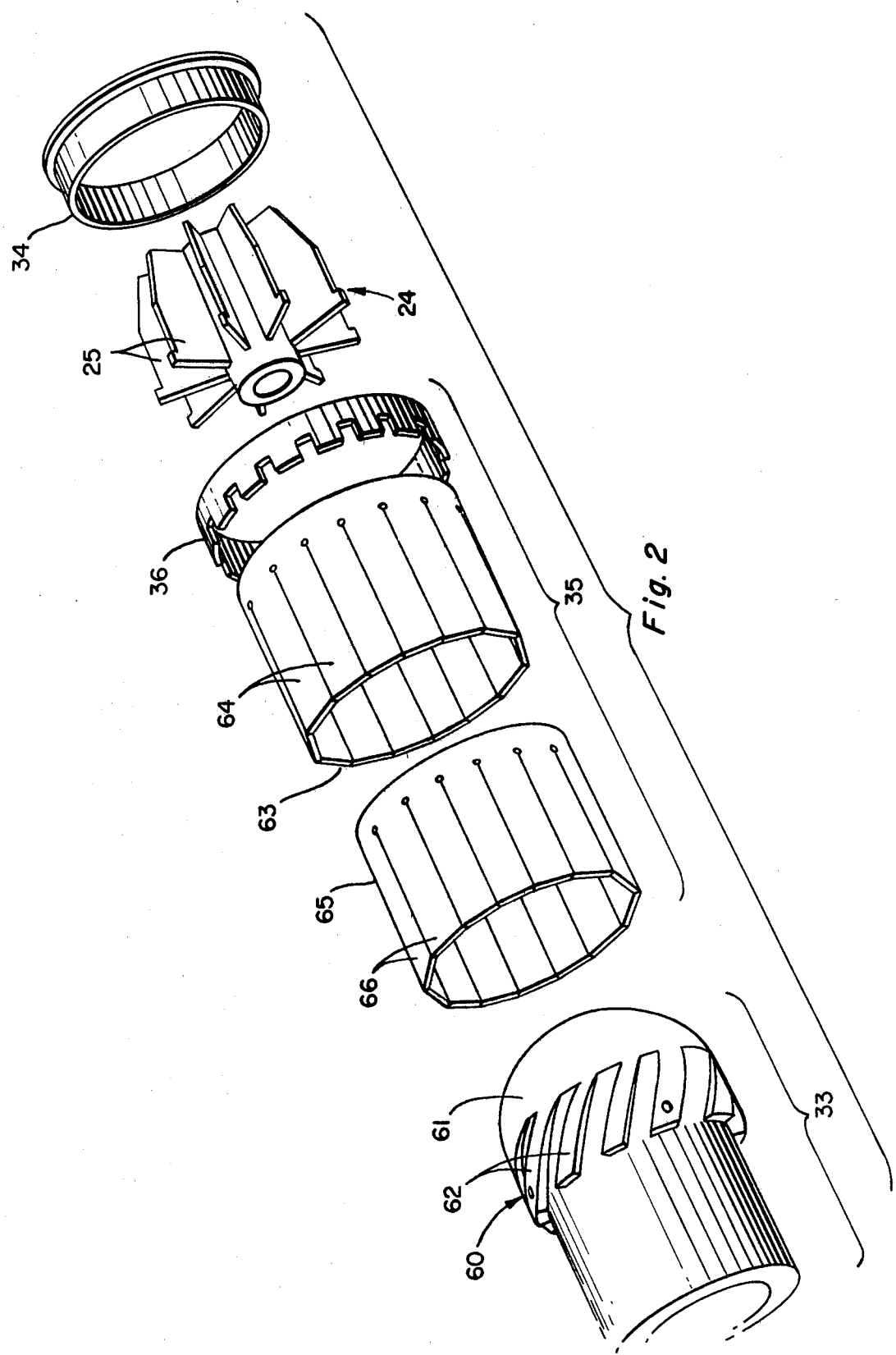
FIG. 2. is an exploded perspective view of certain construction details of the first and second substantially cylindrical conduits and the swirl generator.
Figure 3:
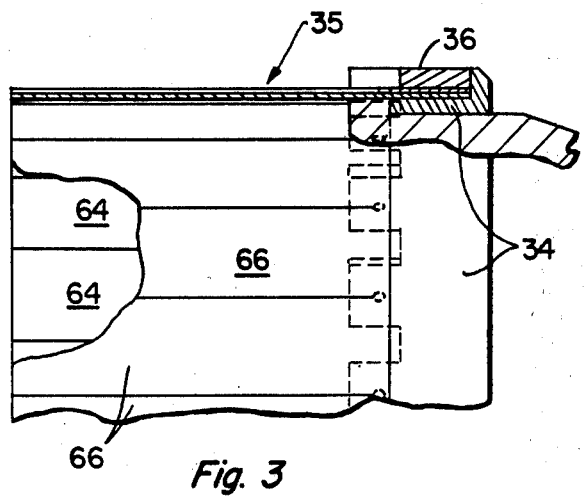
FIG. 3. is a side view, partly in section, of the first and second substantially cylindrical conduits mounted in supporting flanges.

Referring to FIGS. 2 and 3, the swirl generator 33 has a base 60 and a nose portion 61. On the periphery of the nose portion 61 are multiple skewed vanes 62 adjacent to slots in the base 60. The fluid stream impinges first on the nose portion 61 where it is directed radially outwardly toward the slots between the skewed vanes 62 in the base 60 of the swirl generator 35.

Further referring to FIG. 2, the cylindrical conduit 35 surrounds and bears against the swirl generator 33 at rest. At low flow rates, the conduit 35 maintains its cylindrical position, continues to bear against the base 60 of the swirl generator 33, and directs incoming fluid through the vanes 62 of the swirl generator 33.

The discharge end 63 of the conduit 35 has multiple longitudinally extending, independently deflectible resilient fingers 64 that deflect outwardly in response to fluid pressure developed at high flow rates. As a result of this outward deflection, some fluid is directed through the swirl generator 33 while other fluid is directed around the swirl generator where it will not be influenced.

As previously discussed, the conduit 35 is affixed to the outside of the flanged ring 34. A second ring 36 fits over the conduit 35 and the first ring 34. The second ring 36 clamps the ring 34 to the vanes 25 of the flow straightener 24.

Figure 4:
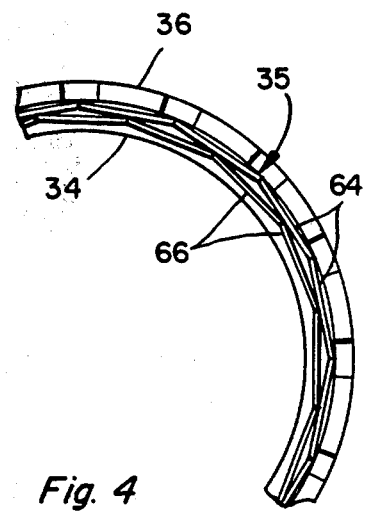
FIG. 4 is a cross-sectional view of the first and second substantially cylindrical conduits.

Further referring to FIGS. 2, 3, and 4, the preferred embodiment of the present invention comprises the resilient fingers 64 in combination with compliant sealing means 65 contiguous to said resilient fingers 64. Outwardly deflectible sealing fingers 66 are concentric with the conduit 35 and contiguous to the inner cylindrical surface of the conduit 35. In this embodiment, each deflectible sealing finger 66 has substantially the same circumferential dimension as a resilient finger 64 of the conduit 35 and overlaps a pair of contiguous resilient fingers 64. The sealing means 65 fits over the flanged ring 34 inside the conduit 35.

During operation at low flow rates, the sealing fingers 66 significantly reduce leakage between the resilient fingers 64. As flow rate increases, the resilient fingers 64 deflect outwardly. The modulus of elasticity for the sealing fingers 66 is selected so that the sealing fingers 66 remain in contact with the fingers 64 as they deflect without impeding either the deflection or the flow of fluid. Thus, the sealing fingers 66 constitute one embodiment of an elastic sealing means that is contiguous to a cylindrical surface defined by the resilient fingers at low flow rates and that is sufficiently compliant to maintain a sealing relationship even as the resilient fingers 64 deflect.

A flowmeter that incorporates the sealing means of the present invention has a rotor velocity at low flow rates that is significantly greater than the velocity achieved in prior flowmeters. Specifically, rotor velocities in the range of three revolutions per second (RPS) have been achieved as compared to much lower rotor velocities (i.e., in the order of one RPS) measured in a prior flowmeter. Moreover, this structure of the conduit 35 has provided a related advantage. There is a certain minimum flow rate that is required to start turning the rotor. A conduit 35 constructed in accordance with this invention reduces this minimum. Consequently the minimum measurable flow rate also is reduced, so the flowmeter is more sensitive.

What is claimed as new and desired to be secured by Letters Patent of the United States is:

1. In a mass rate of flow meter of the angular momentum type, having a swirl generator for imparting angular momentum to the measured fluid stream, a restrained reaction turbine located downstream from the swirl generator for removing the imparted angular momentum, the improvement of a substantially cylindrical conduit means for controlling fluid flow to and coaxial with the swirl generator comprising:
   A. multiple, longitudinally extending, independently deflectible, resilient fingers which deflect in response to fluid pressure for conducting fluid to the swirl generator; and
   B. sealing means contiguous to said resilient fingers for substantially reducing fluid leakage between said resilient fingers.

2. A mass rate of flow meter as recited in claim 1, wherein said sealing means comprises compliant means for maintaining a sealing relationship as said resilient fingers deflect.

3. A mass rate of flow meter as recited in claim 1, wherein said resilient fingers are outwardly deflectible and said sealing means comprises independently deflectible means contiguous to an inner cylindrical surface of the conduit and overlapping the resilient fingers.

4. A mass rate of flow meter as recited in claim 3, wherein the deflectible means comprises multiple, longitudinally extending, deflectible sealing fingers, each said sealing finger having substantially the same circumferential dimension as a resilient finger of the conduit and overlapping a pair of contiguous resilient fingers.

* * * * *